United States Patent
Baldwin et al.

(10) Patent No.: US 11,001,369 B2
(45) Date of Patent: May 11, 2021

(54) HYBRID LIGHT WEIGHT ROTORCRAFT HUB TRUNNIONS

(71) Applicant: Bell Helicopter Textron Inc., Fort Worth, TX (US)

(72) Inventors: Tyler Wayne Baldwin, Keller, TX (US); Michael Dearman, Weatherford, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 394 days.

(21) Appl. No.: 15/942,707

(22) Filed: Apr. 2, 2018

(65) Prior Publication Data

US 2019/0300151 A1    Oct. 3, 2019

(51) Int. Cl.
| | |
|---|---|
| *B64C 11/04* | (2006.01) |
| *F16D 3/60* | (2006.01) |
| *F16D 1/10* | (2006.01) |
| *B64F 5/10* | (2017.01) |
| *B64C 29/00* | (2006.01) |
| *B29C 70/84* | (2006.01) |
| *B29L 31/00* | (2006.01) |
| *B22D 25/02* | (2006.01) |
| *B29K 705/00* | (2006.01) |

(52) U.S. Cl.
CPC .............. *B64C 11/04* (2013.01); *B64F 5/10* (2017.01); *F16D 1/10* (2013.01); *F16D 3/60* (2013.01); *B22D 25/02* (2013.01); *B29C 70/84* (2013.01); *B29K 2705/00* (2013.01); *B29L 2031/7498* (2013.01); *B64C 29/0033* (2013.01); *F16D 2001/103* (2013.01); *Y10S 16/41* (2013.01); *Y10S 464/904* (2013.01)

(58) Field of Classification Search
CPC ......... B64C 11/04; B64C 11/06; B64C 27/00; B64C 29/0033; F16D 3/60; F16D 1/10; F16D 2001/103; B64F 5/10; Y10S 464/904; Y10S 16/41; B22D 25/02; B29K 2705/00; B29L 2031/082; B29L 2031/3076; B29L 2015/00; B29L 2031/7498; B29C 37/0082; B29C 70/86; B29C 70/32; B29C 70/84
USPC ............................. 464/69; 156/173; 264/35
See application file for complete search history.

(56) References Cited

U.S. PATENT DOCUMENTS 2,827,777 A * 3/1958 Molyneux ............... B64C 27/12
464/904
3,135,103 A * 6/1964 Black .................... E21B 17/073
(Continued)

*Primary Examiner* — Greg Binda
(74) *Attorney, Agent, or Firm* — Fogarty LLP

(57) ABSTRACT

A light weight hybrid torque transfer joint trunnion has an integral metal hub spline fitting oriented on a center axis. This integral metal hub spline fitting may be made of steel, aluminum, titanium, or the like and may be generally cylindrical. The integral metal hub spline fitting defines an integral central internally-splined mast or driveshaft coupling opening centered about the center axis. A composite material body centrally retains, and is cured to, the metal hub spline fitting. Torque transfer joint link attachment pins extend from the composite material body and are rigidly linked to the metal hub spline fitting. In an example constant-velocity joint, a plurality of pivoting linkages may each be rotatably coupled to the torque transfer joint link attachment pins, and each of the plurality of pivoting linkages may, in turn be secured to a rotor yoke configured to mount a plurality of rotorcraft blades.

19 Claims, 8 Drawing Sheets

(56) References Cited

U.S. PATENT DOCUMENTS

| | | | | |
|---|---|---|---|---|
| 4,804,352 A | * | 2/1989 | Schmidt | B64C 27/41 |
| | | | | 464/69 |
| 7,397,158 B2 | * | 7/2008 | Lee | D06F 37/304 |
| 8,904,904 B2 | * | 12/2014 | Stewart | B29C 53/822 |
| 9,701,403 B2 | * | 7/2017 | Kizhakkepat | B29C 70/202 |
| 2016/0363206 A1 | | 12/2016 | Modrzejewski et al. | |

* cited by examiner

HYBRID LIGHT WEIGHT ROTORCRAFT HUB TRUNNIONS

TECHNICAL FIELD

The present disclosure relates generally to rotorcraft, more particularly to rotorcraft hub trunnions, and specifically to hybrid light weight rotorcraft hub trunnions.

BACKGROUND

A rotorcraft (i.e. rotary-wing aircraft, such as helicopters and tiltrotor aircraft) may include one or more rotor systems. At least one rotor provides lift and propulsion forces. These rotors have at least two airfoil blades connected to a rotatable hub. In such a hub, a trunnion transfers torque from an engine driven mast (or the like) to the blades. For example, in a helicopter a main rotor system, or in a tiltrotor aircraft, the rotor may generate aerodynamic lift to support the weight of the rotorcraft in flight and thrust to counteract aerodynamic drag and move the rotorcraft in forward flight.

Tiltrotor aircraft may operate in a helicopter mode by tilting at least a rotor portion of the craft's nacelles upright and in an airplane mode by tilting the nacelles forward. While in helicopter mode the aircraft may perform vertical maneuverers, including vertical takeoff and landing, as well as hover and sideward movement. Tiltrotor aircraft may generate greater forward speed in airplane mode than in helicopter mode because, in airplane mode, blades are oriented to generate greater thrust propelling the aircraft forward (somewhat analogous to a propeller), Designs of rotors and propellers for aircraft are often extremely complex. A large number of factors must be taken into account, including flexure of the rotor under heavy loads and the required motions of the rotor blades with respect to the drive mechanism. Constant-velocity joints may be used between the rotor mast and the blades, giving rise to a relatively complex assembly at the hub of the rotor mast. The advent of the tiltrotor aircraft has added performance requirements to the hub assembly, resulting from the more complex operation of the craft. The prop systems on a tiltrotor are very large by comparison with standard aircraft. Hence, considerations for proprotors, used as both propellers and rotors in aircraft such as a tiltrotor aircraft, can be even more complex than usual.

Composite materials have been employed in the fabrication of a wide variety of components for aircraft, e.g., rotorcraft rotor system components. In comparison to a machined metal forging, or the like, composite materials are lighter in weight, while metal components may be more durable in certain circumstances.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide a hybrid torque transfer joint trunnion that includes an integral metal hub spline fitting oriented on a center axis. This integral metal hub spline fitting may be made of steel, aluminum, titanium, or the like and may be generally cylindrical. The integral metal hub spline fitting defines an integral central internally-splined mast or driveshaft coupling opening portion centered about the center axis. A composite material body centrally retains, and is cured to, the metal hub spline fitting. A plurality of (metal) torque transfer joint link attachment pins extend from the composite material body and are rigidly linked to the metal hub spline fitting.

The integral metal hub spline fitting may also define at least one integral peripheral exterior radial key portion indexed with a keyway defined in a central metal hub spline fitting receptive opening defined by the composite material body, for retaining the metal hub spline fitting with respect to the composite material body.

Alternatively, or additionally, the integral metal hub spline fitting may define a plurality of integral peripheral exterior radial boss portions for rigidly linking the torque transfer joint link attachment pins to the integral metal hub spline fitting. Also, or alternatively a plurality of metal fixtures cured into the composite material body may be used to mechanically rigidly link the torque transfer joint link attachment pins to the metal hub spline fitting. For example, each of the metal fixtures may be secured to the metal hub spline fitting and each of the torque transfer joint link attachment pins may, in turn, be secured to a respective metal fixture. In a particular example, wherein the integral metal hub spline fitting defines the integral peripheral exterior radial threaded bosses, each of the metal fixtures may be bolted to one of the threaded boss portions of the metal hub spline fitting, through the composite material body, and each of the torque transfer joint link attachment pins may, in turn, be bolted to one of the metal fixtures.

Hence, an implementation for manufacturing a hybrid torque transfer joint trunnion may call for casting, forging and/or machining an integral metal hub spline fitting oriented on a center axis to define an integral central internally-splined mast or driveshaft coupling opening portion in the integral metal hub spline fitting, centered about the center axis. This metal hub spline fitting is then centrally cured into the composite material body and the torque transfer joint link attachment pins are rigidly linked to the metal hub spline fitting to extend from the composite material body.

In some implementations, casting, forging and/or machining the integral metal hub spline fitting may include casting, forging and/or machining (an) integral peripheral exterior radial key portion(s) on the integral metal hub spline fitting. In such implementations, the composite material body may be laid up prior to curing, using a broad goods construction technique, alternatingly orienting fiber plies. A central metal hub spline fitting receptive opening, defining at least one circumferential keyway, may be machined in the resulting composite material body and each integral metal hub spline fitting key portion may be indexed with a respective keyway, for curing the hub spline fitting and composite body. Also, in such implementations, a plurality of metal fixture receptive openings may be machined into the composite material body, and a metal fixture may be disposed in each of the metal fixture receptive openings, for curing the composite material body to each metal fixture. Therein, each torque transfer joint link attachment pin may be mechanically secured to a respective metal fixture.

In some other implementations curing the metal hub spline fitting centrally to the composite material body further may call for laying up the composite material body using a fiber placement construction technique, winding resin impregnated fiber tows around a centrally positioned metal hub spline fitting, to form the composite material body. In a further example of such an implementation, a plurality of metal fixtures may be disposed in conjunction with the metal hub spline fitting, and the composite material body may be laid up using a fiber placement construction technique, by winding resin impregnated fiber tows around the metal hub spline fitting and the metal fixtures to form the composite material body around the metal hub spline fitting and the metal fixtures. In such implementations, each of a plurality of metal fixtures may be secured (e.g. bolted) to the metal hub spline fitting, the metal fixtures may be cured into the composite material body, and each of the torque transfer joint link attachment pins may be secured (e.g. bolted) to a respective one of the metal fixtures. In particular, where casting, forging and/or machining the integral metal hub spline fitting includes casting, forging and/or machining a plurality of integral peripheral exterior radial threaded boss portions on the metal hub spline fitting, one of a plurality of metal fixtures may be bolted to each boss, the metal fixtures may be cured into the composite material body, before or after, each of the torque transfer joint link attachment pins is bolted to a respective metal fixture.

In an example constant-velocity joint, a plurality of pivoting linkages may each be rotatably coupled to one torque transfer joint link attachment pin of such a hybrid torque transfer joint trunnion, and each of the plurality of pivoting linkages may, in turn be to a rotor yoke configured to mount a plurality of rotorcraft blades.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
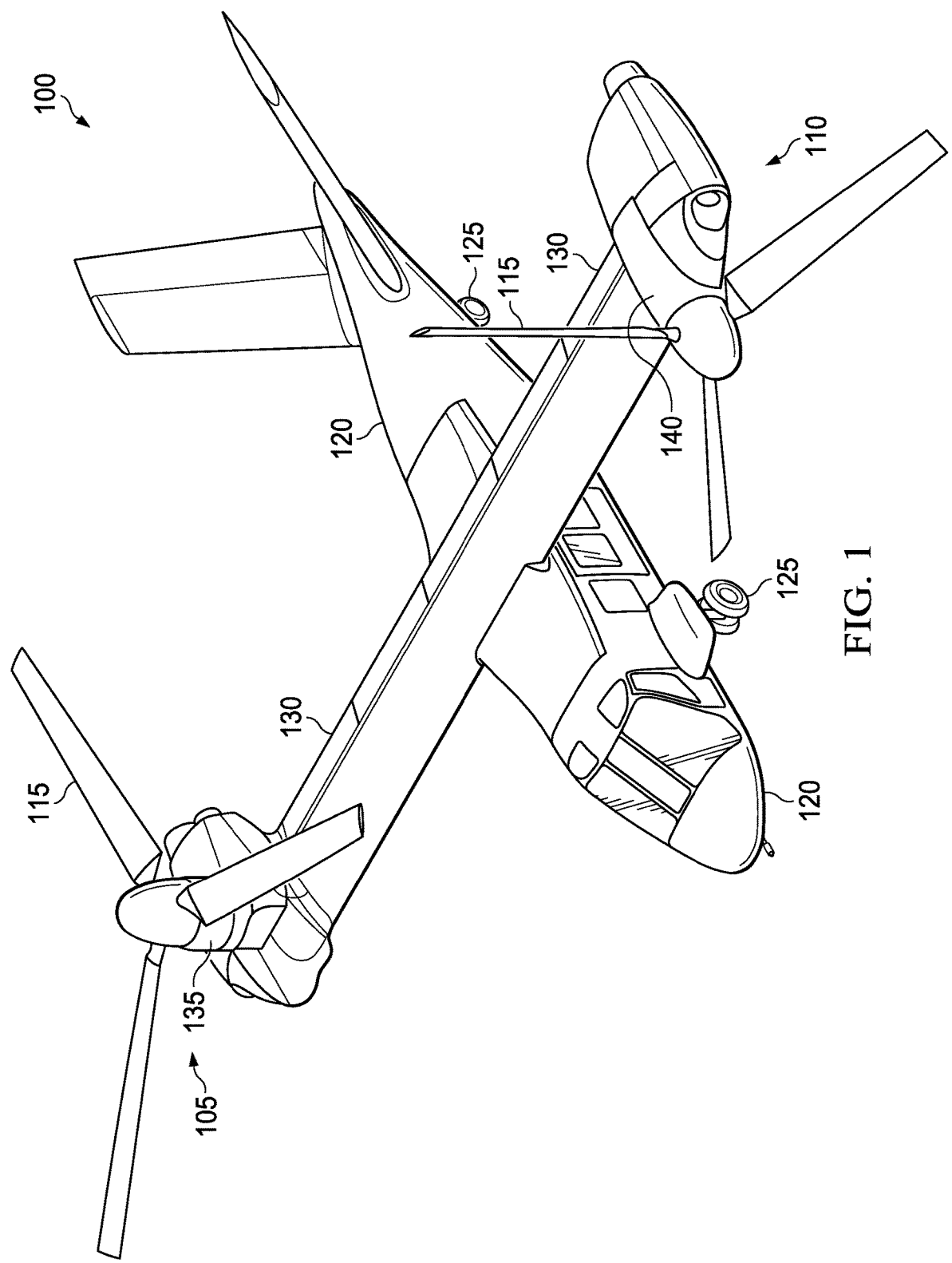
Figure 2:
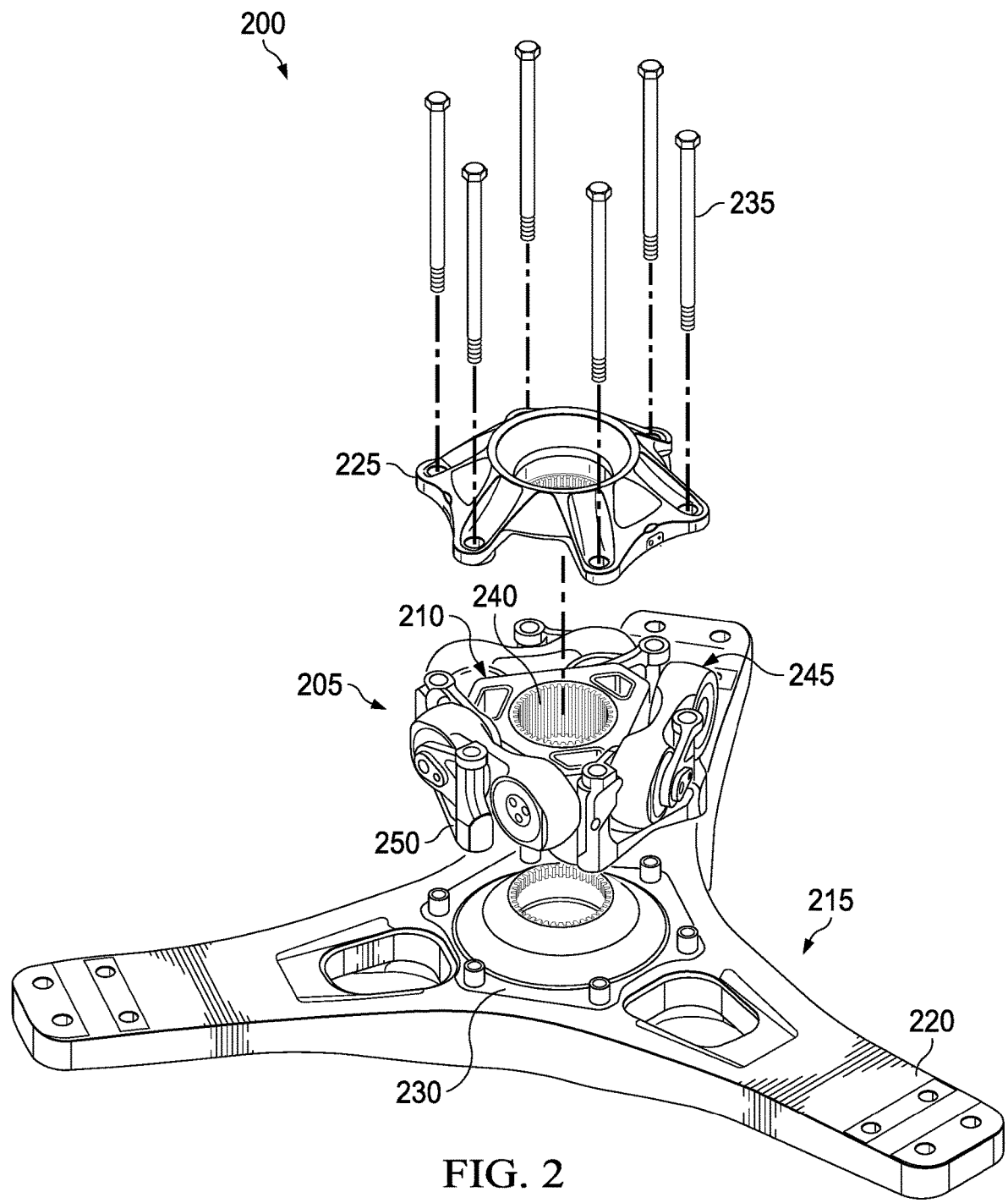
Figure 3:
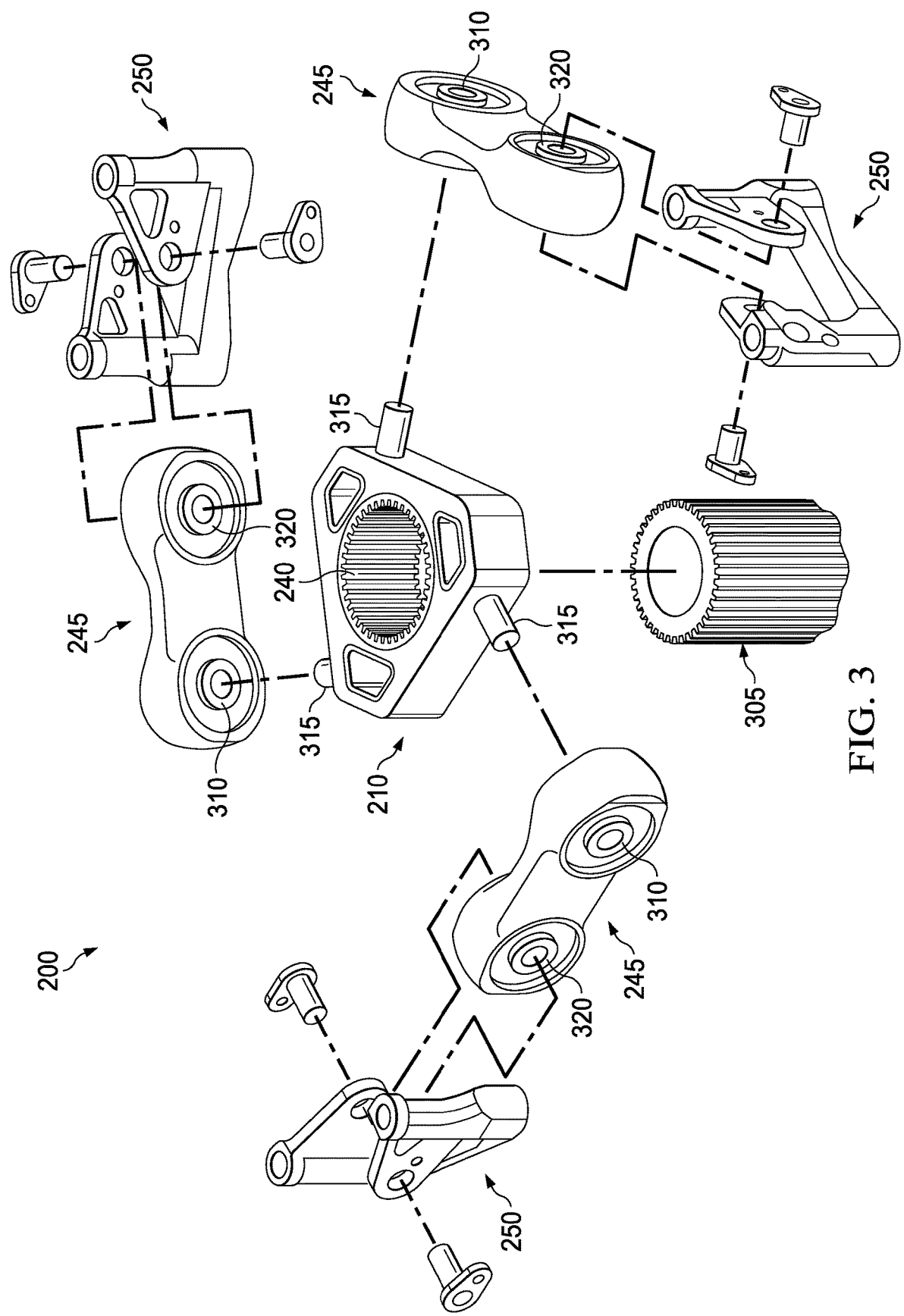
Figure 4:
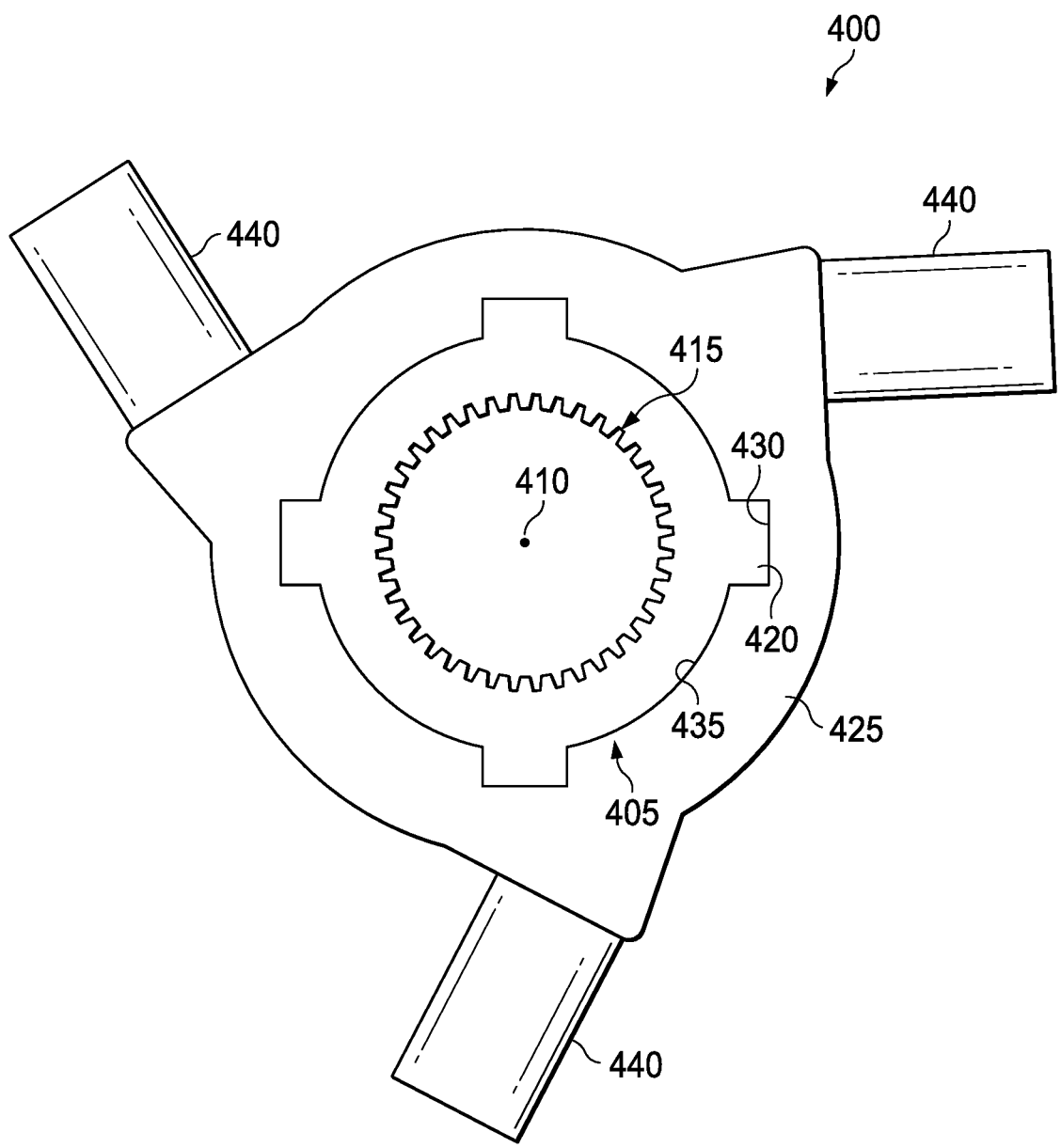
Figure 5:
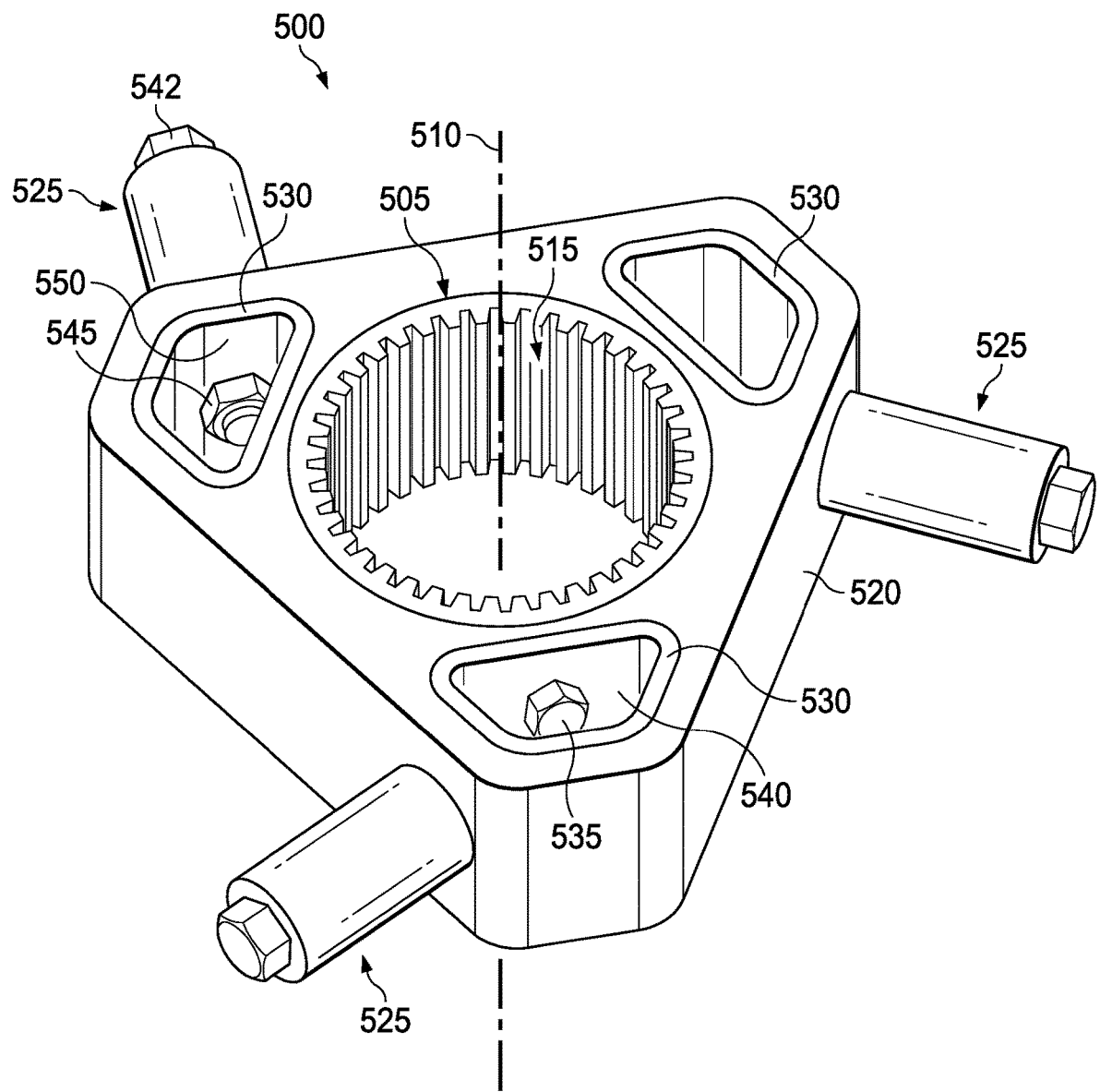
Figure 6:
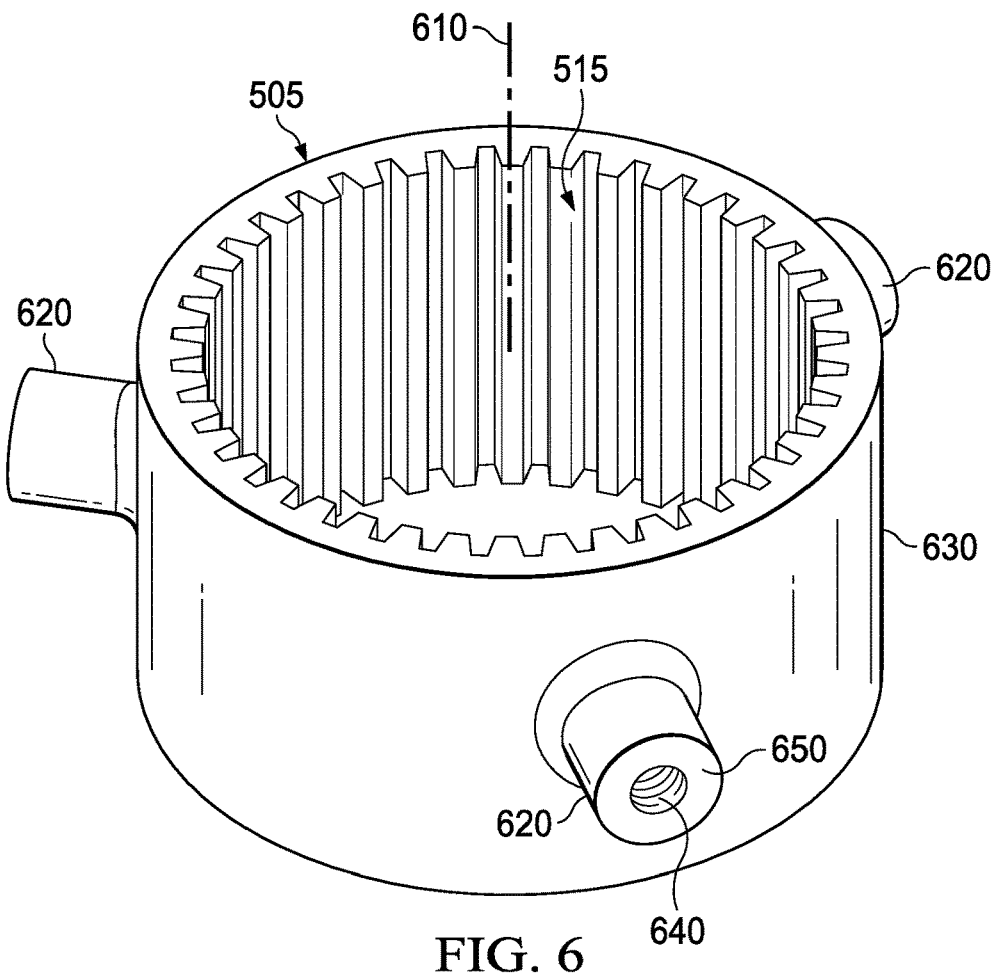
Figure 7:
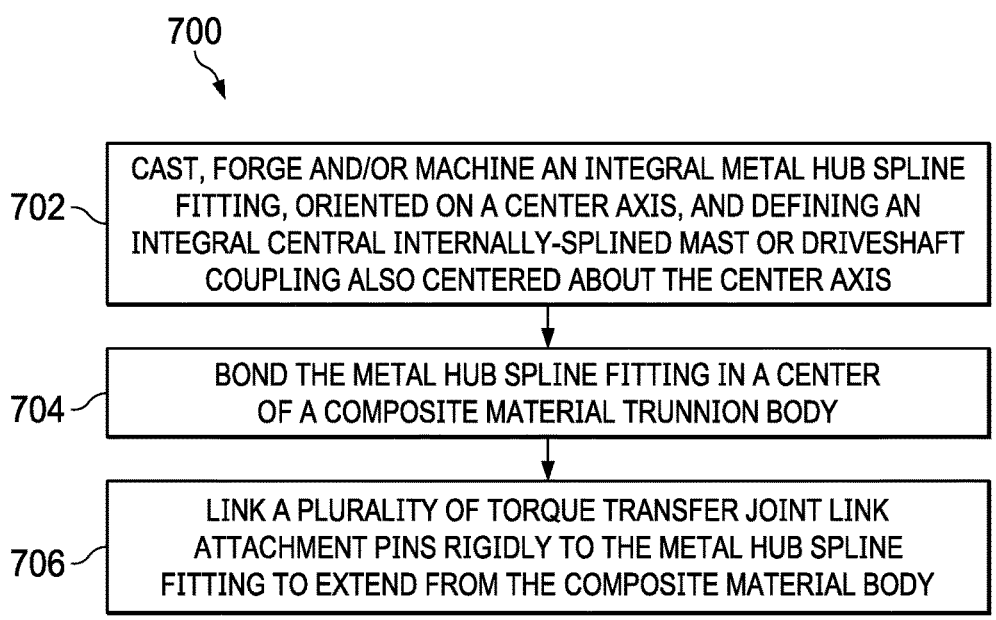
Figure 8:
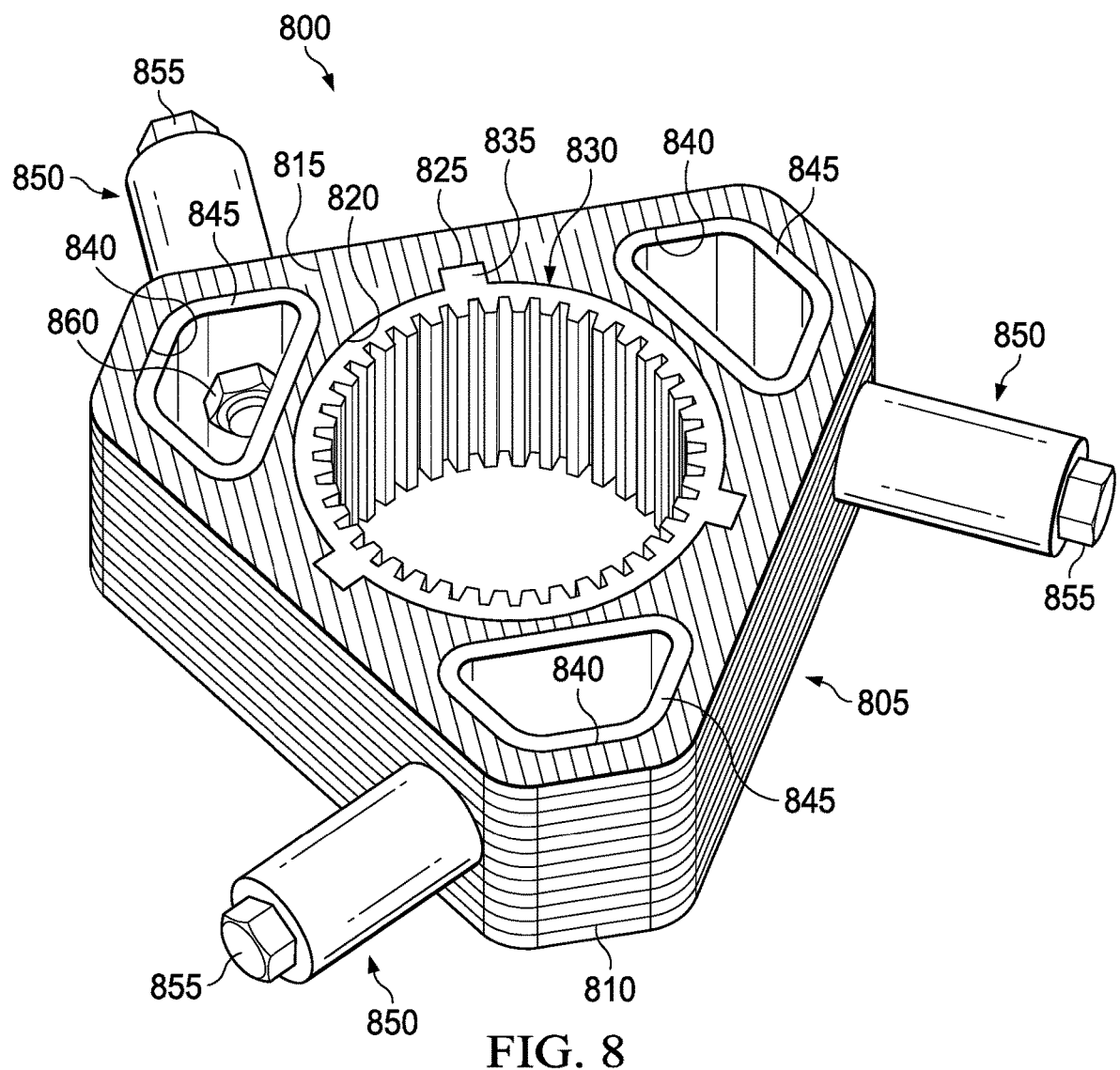
Figure 9:
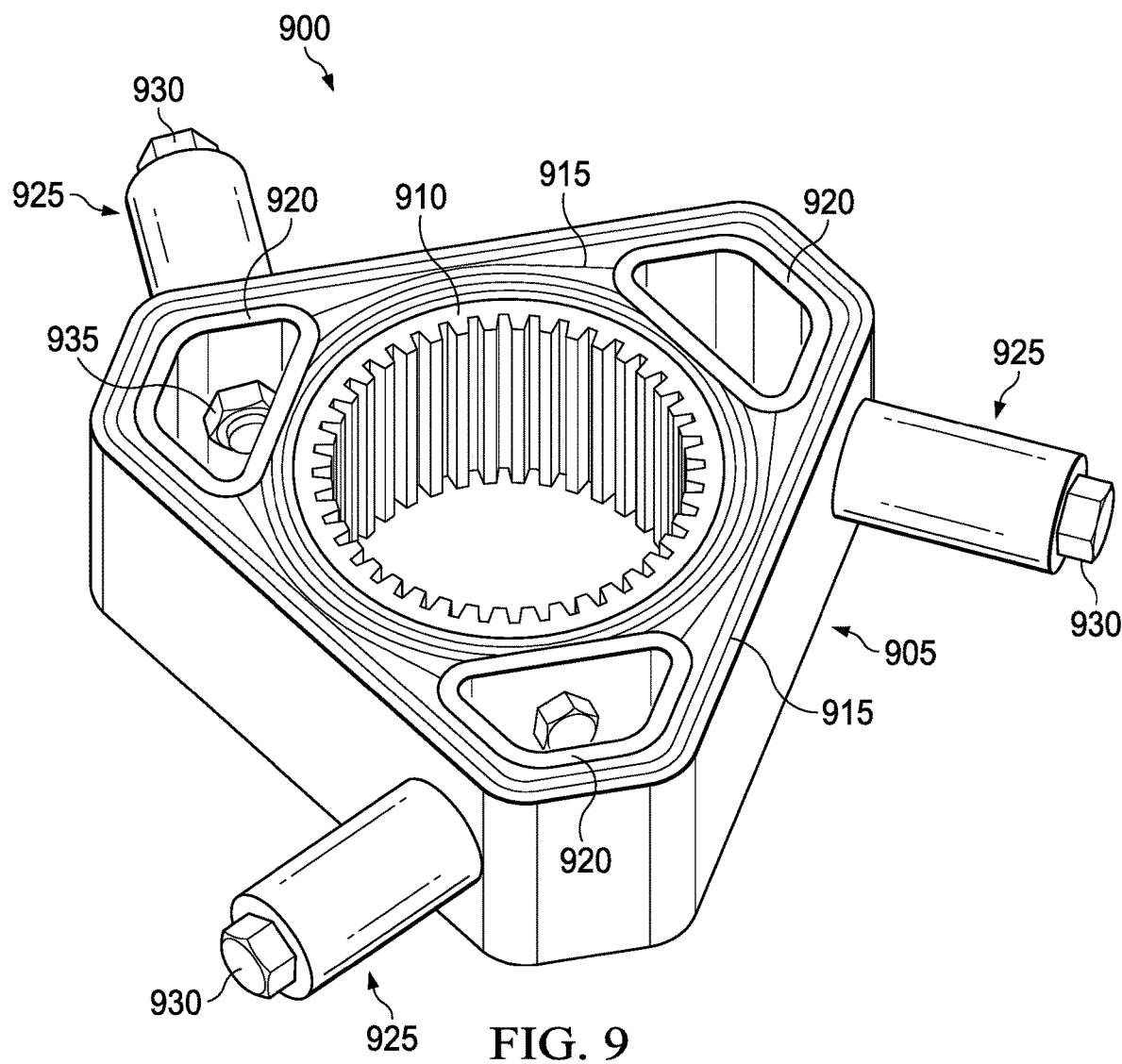

Having thus described the invention in general terms, reference will now be made to the accompanying drawings, which are not necessarily drawn to scale and which are incorporated in and form part of the specification and in which like numerals designate like parts, illustrate embodiments of the present invention and together with the description, serve to explain the principles of the invention. In the drawings:

FIG. 1 is perspective view of a tiltrotor aircraft, such as may employ embodiments of the present systems and methods;

FIG. 2 is a partially exploded perspective view of a portion of a rotor hub assembly of a rotorcraft such as the tiltrotor aircraft of FIG. 1, showing a constant-velocity joint such as may employ embodiments of the present hybrid light weight rotorcraft hub trunnions;

FIG. 3 is a further exploded perspective view of the portion of the rotor hub assembly of FIG. 2 showing the constant-velocity joint further exploded;

FIG. 4 is a diagrammatic top perspective view of an example hybrid light weight rotorcraft hub trunnion, according to at least one embodiment of the present systems and methods;

FIG. 5 is a perspective view of an example hybrid light weight rotorcraft hub trunnion, according to at least one embodiment of the present systems and methods;

FIG. 6 is a perspective view of an example integral metal hub spline fitting for a hybrid light weight rotorcraft hub trunnion, according to at least one embodiment of the present systems and methods;

FIG. 7 is flowchart of an example process for manufacturing the present hybrid light weight rotorcraft hub trunnion, according to at least one embodiment of the present systems and methods;

FIG. 8 is a perspective view of an example hybrid light weight rotorcraft hub trunnion with a composite body laid up using a broad goods manufacturing technique, according to at least one embodiment of the present systems and methods; and FIG. 9 is a perspective view of an example hybrid light weight rotorcraft hub trunnion with a composite body laid up using a fiber placement manufacturing technique, according to at least one embodiment of the present systems and methods.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Embodiments of the present systems and methods relate generally to rotorcraft, more particularly to rotorcraft hub trunnions, and specifically to hybrid light weight rotorcraft hub trunnions, hybrid composite/metal trunnions, and the like. In accordance with embodiments of the present systems and methods, a light weight hybrid torque transfer joint trunnion has an integral metal hub spline fitting oriented on a center axis. This integral metal hub spline fitting defines an integral central internally-splined mast or driveshaft coupling opening centered about the center axis. A composite material body centrally retains, and is cured to, the metal hub spline fitting. That is, the composite material body may be "bonded to" the metal hub spline fitting by being cured to metal hub spline fitting, entrapping the metal hub spline fitting. Adhesive, or the like, may, or may not be used to "bond" the composite material body to the metal hub spline fitting during such curing of the composite material body to the metal hub spline fitting. Torque transfer joint link attachment pins extend from the composite material body and are rigidly linked to the metal hub spline fitting. In an example constant-velocity joint, a plurality of pivoting linkages may each be rotatably coupled to the torque transfer joint link attachment pins, and each of the plurality of pivoting linkages may, in turn be secured to a rotor yoke configured to mount a plurality of rotorcraft blades.

Rotorcraft hub trunnions are typically heavy metal parts. As noted, the present light weight rotorcraft hub trunnion is a hybrid of composite material and metal. Embodiments of the present hybrid light weight rotorcraft hub trunnion can save up to sixty percent compared to the weight of a metal (all steel) trunnion. The present hybrid light weight rotorcraft hub trunnion takes advantage of the weight saving opportunity of composites while retaining the abrasive benefits of metal. Metal components of the present hybrid light weight rotorcraft hub trunnion define internal splines to mate with the rotorcraft's mast or driveshaft and accept torque from the mast/driveshaft. The composite that forms the body of the hybrid light weight rotorcraft hub trunnion will transfer the torque to attached parts.

FIG. 1 is perspective view of tiltrotor aircraft 100, such as may employ embodiments of the present systems and methods. Rotorcraft 100 features rotor systems 105 and 110, blades 115, a fuselage 120, landing gear 125, and wing 130. Rotor systems 105 and 110 rotate blades 115 and may include a control system for selectively controlling pitch of each blade 115 in order to selectively control direction, thrust, and lift of rotorcraft 100. In the example of FIG. 1, rotorcraft 100 is a tiltrotor aircraft, and rotor systems 105 and 110 take the form of rotatable nacelles. In this example, the position of at least the rotor portion and driveshafts/masts of nacelles 105 and 110, as well as the pitch of rotor blades 115, can be selectively and separately controlled in order to selectively control direction, thrust, and lift of tiltrotor aircraft 100. Fuselage 120, the main body of rotorcraft 100, may be coupled to rotor systems 105 and 110 (e.g., via wing 130) such that rotor systems 105 and 110 and blades 115 may move fuselage 120 through the air. Landing gear 125 supports rotorcraft 100 when rotorcraft 100 is landing and/or when rotorcraft 100 is at rest on the ground. Various embodiments of the present systems and methods relating to rotor systems described herein may apply to rotor systems 105 and 110 and/or other rotor systems, such as non-tilting rotor, helicopter rotor systems, aircraft other than rotorcraft, such as airplanes and unmanned (drone) aircraft, or the like.

In the example of FIG. 1, tiltrotor aircraft 100 may operate in a helicopter mode by tilting at least the rotor portion 135 and driveshafts/masts of nacelles 105 and 110 upright, as shown with respect to nacelle 105. Tiltrotor aircraft 100 may operate in an airplane mode by tilting (rotor portion 140 and driveshafts/masts of) the nacelles forward, as nacelle 110 is shown. Tiltrotor aircraft 100 may operate in a transition flight mode or conversion flight mode by tilting the (rotor portion and driveshafts/masts of) nacelles between the upright and forward orientations. Tiltrotor aircraft 100 may generate greater forward speed in airplane mode than in helicopter mode because, in airplane mode, blades 115 are oriented to generate greater thrust propelling the aircraft forward (somewhat analogous to a propeller). While in helicopter mode tiltrotor aircraft 100 can take off and land vertically, hover and fly sideward.

As noted, designs of rotors and propellers for aircraft are often (extremely) complex. A large number of factors must be taken into account, including flexure of the rotor under heavy loads and the required motions of the rotor blades with respect to the drive mechanism. The considerations for proprotors, used as both propellers and rotors in aircraft such as tiltrotor aircraft 100, can be more complex than usual. Gimbaled rotors may be used in such aircraft. In a gimbaled rotor, joints must be provided between the driveshaft/mast that carries torque from the engine and the yoke that drives the blades, giving rise to a relatively complex hub assembly.

FIG. 2 is a partially exploded perspective view of a portion of gimbaled rotor hub assembly 200 of a rotorcraft, such as tiltrotor aircraft 100 of FIG. 1, showing constant-velocity joint 205 such as may employ embodiments of the present hybrid light weight rotorcraft hub trunnions (210). FIG. 3 is a further exploded perspective view of the portion of gimbaled rotor assembly 200 of FIG. 2, showing constant-velocity joint 205 partially exploded, better showing position of present hybrid light weight rotorcraft hub trunnion 210 in constant-velocity joint 205.

FIG. 2 shows example rotor hub assembly 200, in conjunction with yoke 215. Yoke 215 has three arms 220 that extend radially and are configured for attachment of rotor blades 115 thereto. However, yoke 215 may have any number of arms, but generally two to four. Rotor hub assembly 200 may comprise an upper hub-spring plate 225 and lower hub-spring plate 230, with constant-velocity (CV) joint 205 carried therebetween, secured to yoke 215 by through-bolts 235. In accordance with embodiments of the present systems and methods hybrid light weight rotorcraft hub trunnion 210 has a splined opening 240 for receiving splined driveshaft/mast 305 (shown in FIG. 3). Hybrid light weight rotorcraft hub trunnion 210 is connected through a pivoting linkage, or the like to pillow blocks, which then connect to yoke 215. In such implementations the pivoting linkage may be comprised of three pairs of members, or the like, each pair of members having a link (245) and pillow block (250), with a leading-end bearing 310 (see FIG. 3) of each link 245 being connected to one pin 315 of hybrid light weight rotorcraft hub trunnion 210 and a trailing-end 320 of each link 245 being connected to one of pillow blocks 250. Pillow blocks 250 are connected to hub-spring plates 225 and 230 by through bolts 235, which also secure hub-spring plates 225 and 230 to each other and to yoke 215. This provides a path for torque to be transferred from driveshaft/mast 305 into hybrid light weight rotorcraft hub trunnion 210, though hybrid light weight rotorcraft hub trunnion 210 into links 245, through links 245 into pillow blocks 250, through pillow blocks 250 into bolts 235 and hub-spring plates 225 and 230, and through bolts 235 and hub-spring plates 225 and 230 into yoke 215 for driving blades 115. Thus, all force driving blades 115 passes through present hybrid light weight rotorcraft hub trunnion 210 before being split by constant-velocity joint 205 to each blade 115.

FIG. 4 is a diagrammatic top perspective view of an example hybrid light weight torque transfer joint trunnion, hybrid light weight rotorcraft hub trunnion 400, according to at least one embodiment of the present systems and methods. Hybrid light weight rotorcraft hub trunnion 400 may be employed as a rotorcraft hub trunnion (210) in a rotorcraft hub constant-velocity joint as described above, or in a similar manner. Integrally cured hybrid light weight torque transfer joint trunnion 400 may comprise a generally cylindrical integral metal hub spline fitting 405 oriented along central axis 410 (perpendicular to FIG. 4 top perspective view). As discussed below, metal hub spline fitting 405 may be cast, forged and/or machined to define integral, central internally-splined driveshaft/mast receptive and coupling opening portion 415 centered along the central axis. Hub spline fitting 405 may also define at least one integral peripheral exterior key portion 420 extending normal to integral cylindrical hub spline fitting 405. Composite material body 425 centrally retains and is bonded to the metal hub spline fitting 405. As noted, composite material body 425 may be "bonded to" metal hub spline fitting 405 by being cured to metal hub spline fitting, entrapping the metal hub spline fitting. Adhesive, or the like, may, or may not be used to "bond" composite material body 425 to metal hub spline fitting 405 during such curing of the composite material body to the metal hub spline fitting. Key portion(s) 420 of hub spline fitting 405 may be indexed with keyway 430 defined in central hub spline fitting receptive opening 435 defined by composite material body 425, retaining metal hub spline fitting 405. Thereby, machined keys 420 on metal spline part 405 mates with composite part 425 to transfer torque from the splines to the arms of trunnion 400.

A plurality of torque transfer joint link attachment pins 440 extend from composite material body 425 and are (rigidly) linked to metal hub spline fitting 405 for torque transfer from a rotor driveshaft/mast, through metal hub spline fitting 405 to pins 440. In the manner discussed above, with respect to FIGS. 1 through 3, to provide a constant-velocity joint between the rotor driveshaft/mast and a rotor yoke, each of a plurality of pivoting linkages may be rotatably coupled to one of torque transfer joint link attachment pins 440. In turn, each of the plurality of pivoting linkage may be coupled to a rotor yoke, or the like, configured to mount a plurality of rotorcraft blades, in accordance with embodiments of the present systems and methods.

FIG. 5 is a more detailed perspective view of an example hybrid light weight torque transfer joint trunnion, hybrid light weight rotorcraft hub trunnion 500, according to at least one embodiment of the present systems and methods. Hybrid light weight rotorcraft hub trunnion 500 may be employed as a rotorcraft hub trunnion (210) in a rotorcraft hub constant-velocity joint as described above. Hybrid light weight torque transfer joint trunnion 500 comprises generally cylindrical, integrally cast, forged and/or machined metal hub spline fitting 505 oriented along central axis 510. hub spline fitting 505 also defines integral central internally-splined driveshaft/mast receptive and coupling opening portion 515, centered along central axis 510. Composite material body 520 centrally retains and is cured to metal hub spline fitting 505.

FIG. 6 is a perspective view of example integral metal hub spline fitting 505 for curing into a hybrid light weight rotorcraft hub trunnion, such as illustrated in FIG. 5 and discussed below with respect to FIGS. 7 through 9, according to at least one embodiment of the present systems and methods. Integral metal hub spline fitting 505, may be cast, forged and/or machined, from steel, aluminum, titanium, or the like, by way of example. However, integral hub spline fitting 505, may be cast, forged and/or machined, from any metal (or other material) structurally suitable for use as a hub spline fitting in accordance with the present systems and methods. As noted, integral metal hub spline fitting 505 may be, as illustrated, generally cylindrical and may be generally oriented along center axis 605 and is thereby configured to be oriented along central axis 510 of hybrid light weight rotorcraft hub trunnion 500, for example. As also noted, integral metal hub spline fitting 505 defines integral, central internally-splined, driveshaft/mast receptive and coupling opening 515, centered along center axis 610, and hence central trunnion axis 510. Integral metal hub spline fitting 505 further comprises a plurality of integral peripheral exterior boss portions 620, each extending radially from cylindrical hub spline fitting from body 630 of integral metal hub spline fitting 505. Bosses 620 may define threaded bore 640, providing a means to anchor torque transfer joint link attachment pins 525, as discussed below. In addition, boss portions 620, with or without bore 640 and threaded or not, may at least assist in retaining integral metal hub spline fitting 505 from rotating in the composite material body 520. That is bosses 620 may act as "keys," performing a similar function as keys 420, discussed above, in accordance with some embodiments of the present systems and methods. Additionally, or alternatively, hub spline fitting 505 may also define at least one integral peripheral exterior key portion (420) extending radially from integral cylindrical hub spline fitting 505 to assist in retaining metal hub spline fitting 505 with respect to composite material body 520 (such as in a manner discussed above and/or below).

Returning to FIG. 5, a plurality of torque transfer joint link attachment pins 525, which may be steel, aluminum, titanium, or the like, extend from composite material body 520 and are rigidly linked to metal hub spline fitting 505 for torque transfer from a rotor driveshaft/mast, through metal hub spline fitting 505 to pins 525. To such an end, torque transfer joint trunnion 500 may further employ a plurality of metal fixtures 530 cured into composite material body 520, each metal fixture 530, which may be made of steel, aluminum, titanium, or the like, and may mechanically, rigidly link one of torque transfer joint link attachment pins 525 to metal hub spline fitting 505. Fixtures 530 are illustrated as having a generally parallelogram-shaped cross section, however, they may be of any shape that accommodates linking one or more of torque transfer joint link attachment pins 525 to metal hub spline fitting 505, such as in the manner described below. For example, each of metal fixtures 530 may be secured to metal hub spline fitting 505 and each of torque transfer joint link attachment pins 525 may, in turn, be secured to a respective one of metal fixtures 530.

In particular, each of metal fixtures 530 may be bolted to a respective one of threaded boss portions 620 of metal hub spline fitting 505, through composite material body 520. In this regard, respective bolt 535 may extending through an orifice defined in an inner wall 540 of each respective metal fitting 530 and be threaded and tightened into bore 640 of respective boss 620. Each respective metal fitting 530 inner wall 540 may abut end 650 of the respective boss 620 to promote mechanical stability of the boss-to fixture link, upon tightening of bolt 535.

In turn, each of the torque transfer joint link attachment pins 525 may be bolted to a respective one of metal fixtures 530, such as by respective through bolt 542 extending through each pin 525, secured by respective nut 545 bearing on side wall 550 of each respective metal fixture 530. Each torque transfer joint link attachment pin 525 may extend through composite material body 520 to abut side wall 550 of the respective metal fixture 530 to promote mechanical stability of the pin-to fixture-to-boss link, upon tightening of bolt 542 and nut 545. Thereby, each of torque transfer joint link attachment pins 525 are mechanically rigidly linked to metal hub spline fitting 505, through one of metal fixtures 530.

In the manner discussed above, with respect to FIGS. 1 through 4, to provide a constant-velocity joint between the rotor driveshaft/mast and a rotor yoke, each of a plurality of pivoting linkages may be rotatably coupled to one of torque transfer joint link attachment pins 525. In turn, each of the plurality of pivoting linkage may be coupled to a rotor yoke, or the like, configured to mount a plurality of rotorcraft blades, in accordance with embodiments of the present systems and methods.

FIG. 7 is flowchart of example process 700 for manufacturing an embodiment the present torque transfer joint trunnion, hybrid light weight rotorcraft hub trunnion (210, 400 and/or 500, above, an/or 800 and/or 900, below), according to at least one implementation of the present systems and methods. Therein, a generally cylindrical integral metal hub spline fitting (405, 505) oriented on a center axis (610) is cast, forged and/or machined, at 702, from steel, aluminum, titanium, or the like, by way of example. The integral metal hub spline fitting is cast, forged and/or machined, at 702, to define an integral central internally-splined driveshaft/mast coupling opening portion (415, 515), centered about the center axis. Also, in casting, forging and/or machining the integral metal hub spline fitting, at 702, at least one integral peripheral exterior key portion (420) may be cast, forged and/or machined to extend radially from the integral metal hub spline fitting. Additionally, or alternatively, casting, forging and/or machining the integral metal hub spline fitting, at 702, may also include casting, forging and/or machining a plurality of integral peripheral exterior threaded boss portions extending radially from the integral metal hub spline fitting.

At 704 composite material body (425, 520) is cured to the metal hub spline fitting (405, 505), with the integral metal hub spline fitting's center axis (605) oriented along the central axis (510) of the hybrid light weight rotorcraft hub trunnion. For example, the composite material body centrally retains, and is cured to the metal hub spline fitting by the composite material body may be "bonded to" the metal hub spline fitting by being cured onto metal hub spline fitting, entrapping the metal hub spline fitting. Adhesive, or the like, may, or may not be used to "bond" the composite material body to the metal hub spline fitting during such curing of the composite material body to the metal hub spline fitting.

In some example implementations, as discussed in greater detail below with respect to FIG. 8, prior to curing at 704, the composite material body (425, 520) may be laid up using a broad goods construction technique, alternating orientation of composite fiber plies. Whereafter, a central metal hub spline fitting receptive opening (435), defining at least one circumferential keyway (430), may be machined into the composite material body for indexing a respective keyway with each integral metal hub spline fitting peripheral exterior radial key portion (420) of the metal hub spline fitting, for curing at 704. In this example, a plurality of metal fixture receptive openings may also be machined into the composite material body and a metal fixture (530) may be deposed in each of the metal fixture receptive openings, prior to curing at 704.

In other example implementations, curing the metal hub spline fitting to the composite material body at 704, may include laying up the composite material body (425, 520) using a fiber placement construction technique, placing resin impregnated fibers tows around the metal hub spline fitting centrally to form the composite material body, as discussed further below, with respect to FIG. 9. In such implementations a plurality of metal fixtures may be disposed in conjunction with the metal hub spline fitting and the composite material body is laid up using fiber placement, placing resin impregnated fibers tows around the metal hub spline fitting and the metal fixtures to form the composite material body around the metal hub spline fitting and the metal fixtures.

A plurality of (metal) torque transfer joint link attachment pins (440, 525) are rigidly linked to the metal hub spline fitting (405, 505) at 706. For example, each of a plurality of metal (steel) fixtures (530) may be secured to the metal hub spline fitting (505) and each of the torque transfer joint link attachment pins (525) may be secured to a respective one of the metal fixtures, in turn, at 704, in accordance with various implementations of the present systems and methods. In a particular example, each of the torque transfer joint link attachment pins is secured to a respective one of the metal fixtures by bolting each of the torque transfer joint link attachment pins to a respective one of the metal fixtures. Also, in a further particular example each of the plurality of metal fixtures are secured to the metal hub spline fitting (505) by bolting each of the metal fixtures to a respective boss portion (620) defined in the metal hub spline fitting (505).

Any number of methods may be employed to lay-up composite material body 425, 520 and/or otherwise cure integral metal hub spline fitting 405, 505, etc. with, or to, composite material body 425, 520, in accordance with embodiments and implementations of the present systems and methods. As noted, two methods that may be employed to lay-up composite material body 425, 520 around and/or otherwise cure hybrid light weight rotorcraft hub trunnion metal components (integral metal hub spline fitting 405, 505, pins 440, 525, and in some embodiments metal fixtures 530) with, or to, composite material body 425, 520, include a broad goods manufacturing technique or a fiber placement manufacturing technique. That is, some or all of the metal components (integral metal hub spline fitting 405, 505, pins 440, 525, and in some embodiments metal fixtures 530) may be assembled (i.e. bolted together or otherwise positioned) and then the composite material body (425, 520) formed around (and onto) them, such as through use of a fiber placement manufacturing technique, or the like. Alternatively, and to some degree additionally, the metal components may be deployed into, then cured into, a composite material body preformed using a broad goods manufacturing technique, or the like, to provide hybrid light weight rotorcraft hub trunnion 210, 400, 500.

FIG. 8 is a perspective view of example hybrid light weight rotorcraft hub trunnion 800, with composite body 805 laid up using a broad goods manufacturing technique, according to at least one embodiment of the present systems and methods. Broad goods manufacturing involves stacking layers of fiber plies, see ply layer lines 810, with varying fiber orientations, as indicated by fiber direction lines 815. Following lay up and cure of composite body 805, central metal hub spline fitting receptive opening 820, with keyways 825, is machined out for reception of integral metal hub spline fitting 830 for indexing respective keyways 825 with each integral metal hub spline fitting peripheral exterior radial keys 835 for curing of metal hub spline fitting 830 with composite body 805. As also shown in FIG. 8, a plurality of metal fixture receptive openings 840 may also be machined into composite material body 805 and one metal fixture 845 may be deposed in each of these metal fixture receptive openings 840 for bonding with composite body 805. In such an embodiment, each of torque transfer joint link attachment pins 850 may be secured to a respective metal fixture 845, such as by respective through bolt 855 and nuts 860.

FIG. 9 is a perspective view of example hybrid light weight rotorcraft hub trunnion 900, with composite body 905 laid up using a fiber placement manufacturing technique, according to at least one embodiment of the present systems and methods. In fiber placement a holding tool, or other method, is used to hold at least metal hub spline fitting 910. Then composite tows (i.e. resin impregnated fiber strands or strips) are wound around the metal fittings in a particular pattern, as shown by ply layer lines 915 in composite body 905 in FIG. 9, to achieve the correct shape for composite body 905. In such embodiments, a plurality of metal fixtures 920 may be disposed in conjunction with the metal hub spline fitting 910 for proper placement with respect to one another, prior to fiber placement. Metal fixtures 920 and metal hub spline fitting 910 may be held in proper relative positions using the holding tool, or they may be secured together, such as by bolting each of fittings 920 to a radial threaded boss extending from metal hub spline fitting 910 (such as described above with respect to FIGS. 5 and 6), in proper relative positions. Regardless, composite material body 905 is laid up using a fiber placement construction technique, by placing resin impregnated fibers tows around metal hub spline fitting 910 and metal fixtures 920 to form composite material body 905 around metal hub spline fitting 910 and metal fixtures 920. Torque transfer joint link attachment pins 925 may be secured to a respective metal fixture 920, such as by respective through bolt 830 and nuts 835 after, or prior to, lay up of composite body 905 using fiber placement.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A torque transfer joint trunnion comprising:
    an integral metal hub spline fitting oriented on a center axis and defining an integral central internally-splined mast or driveshaft coupling opening portion centered about the center axis;
    a composite material body centrally retaining and cured to the metal hub spline fitting;
    a plurality of torque transfer joint link attachment pins extending from the composite material body and rigidly linked to the metal hub spline fitting; and
    a plurality of metal fixtures cured into the composite material body, each metal fixture mechanically rigidly linking one of the torque transfer joint link attachment pins to the metal hub spline fitting.

2. The torque transfer joint trunnion of claim 1, wherein the integral metal hub spline fitting further defines at least one integral peripheral exterior radial key portion indexed with a keyway defined in a central metal hub spline fitting receptive opening defined by the composite material body, retaining the metal hub spline fitting.

3. The torque transfer joint trunnion of claim 1, wherein the integral metal hub spline fitting further comprises a plurality of integral peripheral exterior radial boss portions rigidly linked to a respective torque transfer joint link attachment pin.

4. The torque transfer joint trunnion of claim 1, wherein each of the metal fixtures is secured to the metal hub spline fitting and each of the torque transfer joint link attachment pins is secured to one of the metal fixtures.

5. The torque transfer joint trunnion of claim 1, wherein the integral metal hub spline fitting further comprises a plurality of integral peripheral exterior radial threaded boss portions and each of the metal fixtures is bolted to one of the threaded boss portions of the metal hub spline fitting, through the composite material body, and each of the torque transfer joint link attachment pins is bolted to one of the metal fixtures.

6. A method for manufacturing a torque transfer joint trunnion comprising:
    casting, forging and/or machining an integral metal hub spline fitting oriented on a center axis and defining an integral central internally-splined mast or driveshaft coupling opening portion in the integral metal hub spline fitting centered about the center axis;
    laying up a composite material body using a broad goods construction technique, alternatingly orienting fiber plies;
    curing the metal hub spline fitting, centrally, in the composite material body; and
    linking a plurality of torque transfer joint link attachment pins rigidly to the metal hub spline fitting, each torque transfer joint link attachment pin extending from the composite material body.

7. The method of claim 6, wherein casting, forging and/or machining the integral metal hub spline fitting further comprises casting, forging and/or machining at least one integral peripheral exterior radial key portion on the integral metal hub spline fitting.

8. The method of claim 7, further comprising, prior to curing:
    machining a central metal hub spline fitting receptive opening, defining at least one circumferential keyway, in the composite material body; and
    indexing each integral metal hub spline fitting key portion with a respective keyway.

9. The method of claim 6, further comprising, machining a plurality of metal fixture receptive openings in the composite material body and deposing a metal fixture in each of the metal fixture receptive openings, prior to curing, and curing the composite material body to each metal fixture, wherein linking each torque transfer joint link attachment pin rigidly to the metal hub spline fitting further comprises mechanically securing each torque transfer joint link attachment pin to a respective metal fixture.

10. A method for manufacturing a torque transfer joint trunnion comprising:
    casting, forging and/or machining an integral metal hub spline fitting oriented on a center axis and defining an integral central internally-splined mast or driveshaft coupling opening portion in the integral metal hub spline fitting centered about the center axis;
    laying up a composite material body using a fiber placement construction technique winding resin impregnated fiber tows around the metal hub spline fitting centrally to form the composite material body;
    curing the metal hub spline fitting, centrally, in the composite material body; and linking a plurality of torque transfer joint link attachment pins rigidly to the metal hub spline fitting, each torque transfer joint link attachment pin extending from the composite material body.

11. The method of claim 10, further comprising disposing a plurality of metal fixtures in conjunction with the metal hub spline fitting and, winding resin impregnated fiber tows around the metal fixtures to form the composite material body around the metal hub spline fitting and the metal fixtures.

12. A method for manufacturing a torque transfer joint trunnion comprising:
  casting, forging and/or machining an integral metal hub spline fitting oriented on a center axis and defining an integral central internally-splined mast or driveshaft coupling opening portion in the integral metal hub spline fitting centered about the center axis;
  securing each of a plurality of metal fixtures to the metal hub spline fitting;
  curing the metal hub spline fitting, centrally, in the composite material body and the plurality of metal fixtures into the composite material body; and
  securing each of a plurality of torque transfer joint link attachment pins to a respective one of the metal fixtures, linking each of the torque transfer joint link attachment pins rigidly to the metal hub spline fitting, each torque transfer joint link attachment pin extending from the composite material body.

13. The method of claim 12, wherein casting, forging and/or machining the integral metal hub spline fitting further comprises casting, forging and/or machining a plurality of integral peripheral exterior radial threaded boss portions on the metal hub spline fitting, and the method further comprises:
  bolting one of a plurality of metal fixtures to each boss portion;
  bolting each of the torque transfer joint link attachment pins to a respective one of the metal fixtures.

14. A constant-velocity joint comprising:
  a torque transfer joint trunnion comprising:
    an integral metal hub spline fitting oriented along a center axis and defining an integral central internally-splined mast or driveshaft coupling opening portion centered along the center axis;
    a composite material body centrally retaining and cured to the metal hub spline fitting; and
    a plurality of torque transfer joint link attachment pins rigidly linked to the metal hub spline fitting and extending from the composite material body; and
  a plurality of pivoting linkages, each rotatably coupled to one torque transfer joint link attachment pin, each of the plurality of pivoting linkages secured to a rotor yoke configured to mount a plurality of rotorcraft blades.

15. The constant velocity joint of claim 14, wherein the integral metal hub spline fitting further defines at least one integral peripheral exterior radial key portion indexed with a keyway defined in a central metal hub spline fitting receptive opening defined by the composite material body.

16. The constant velocity joint of claim 14, wherein the integral metal hub spline fitting further comprises a plurality of peripheral exterior radial boss portions, each rigidly linked to one torque transfer joint link attachment pin.

17. The constant velocity joint of claim 14, wherein the torque transfer joint trunnion further comprises a plurality of metal fixtures cured into the composite material body, each metal fixture mechanically rigidly linking one of the torque transfer joint link attachment pins to the torque transfer joint trunnion.

18. The constant velocity joint of claim 17, wherein each of the metal fixtures is secured to the metal hub spline fitting and each of the torque transfer joint link attachment pins is secured to one of the metal fixtures.

19. The constant velocity joint of claim 17, wherein the integral metal hub spline fitting further comprises a plurality of integral peripheral exterior radial threaded boss portions and each of the metal fixtures is bolted to one of the threaded boss portions of the metal hub spline fitting, through the composite material body, and each of the torque transfer joint link attachment pins is bolted to one of the metal fixtures.

* * * * *